A. P. STECKEL.
CONTROLLING MEANS FOR ELECTRICAL CLUTCH DRIVING MECHANISM.
APPLICATION FILED DEC. 11, 1908.

934,104.

Patented Sept. 14, 1909.
2 SHEETS—SHEET 1.

Witnesses:
E. A. Volk.
A. S. Dimond.

Inventor:
Abram P. Steckel,
By Wilhelm, Parker & Hand
Attorneys

A. P. STECKEL.
CONTROLLING MEANS FOR ELECTRICAL CLUTCH DRIVING MECHANISM.
APPLICATION FILED DEC. 11, 1908.
934,104.
Patented Sept. 14, 1909.
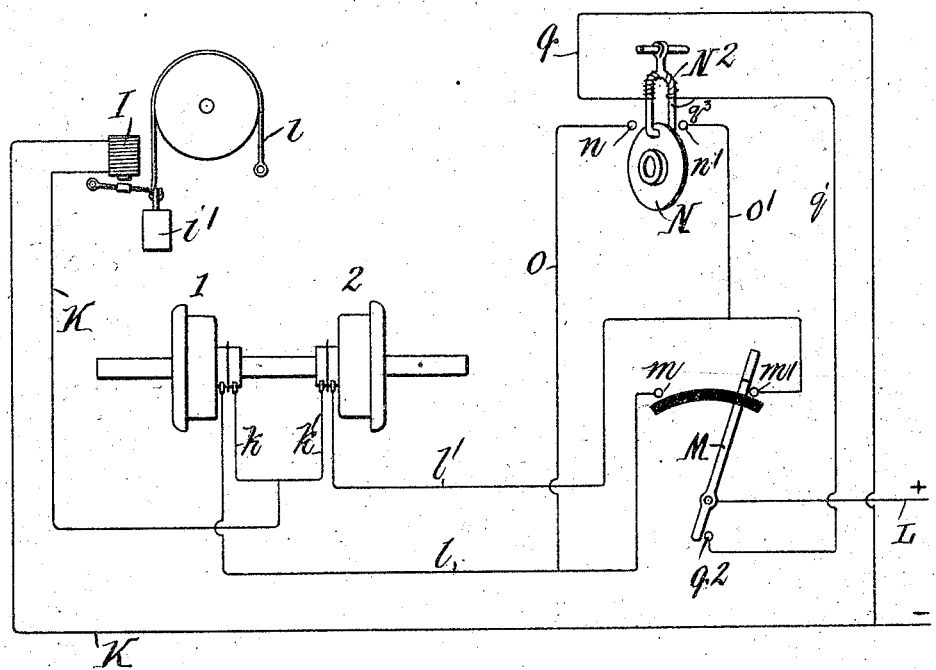

UNITED STATES PATENT OFFICE.

ABRAM P. STECKEL, OF BUFFALO, NEW YORK.

CONTROLLING MEANS FOR ELECTRICAL CLUTCH DRIVING MECHANISM.

934,104. Specification of Letters Patent. Patented Sept. 14, 1909.

Application filed December 11, 1908. Serial No. 467,025.

*To all whom it may concern:*

Be it known that I, ABRAM P. STECKEL, a citizen of the United States, residing at Buffalo, in the county of Erie and State of New York, have invented a new and useful Improvement in Controlling Means for Electrical Clutch Driving Mechanisms, of which the following is a specification.

This invention relates to controlling means for mechanisms which include two electric induction clutches and are used for starting, stopping and reversing the motion of a machine or element which is driven from an element that runs continuously in one direction.

The invention is especially desirable for use with elevators and hoisting machinery where several drives are operated from the same continuously running line shaft, but is also applicable to other machinery, such, for instance, as metal planers and rolling mills, in which a part has to be driven in opposite directions and frequently started, stopped and reversed.

The objects of the invention are to provide means whereby when the power is cut off from the driven member and it is coasting, one or the other clutch will act to oppose the coasting motion so as to gradually arrest the motion of the driven element and bring it to a stop gently and without shock; also to provide a brake for the driven element which is operated in conjunction with the clutches in such manner that it is applied only to hold the driven element stationary after the motion thereof has been arrested by the action of the clutches, whereby the driven element is stopped more gently and is securely held, and the wear on the brake is greatly reduced; also to provide a switch and connections which operate automatically to excite either clutch for opposing motion previously set up by the other clutch only when the current has been cut off from such other clutch and the driven element is coasting and only long enough to bring the driven element to rest; also to improve clutch driving mechanisms of the character stated in the respects hereinafter described and set forth in the claims.

Figure 1:
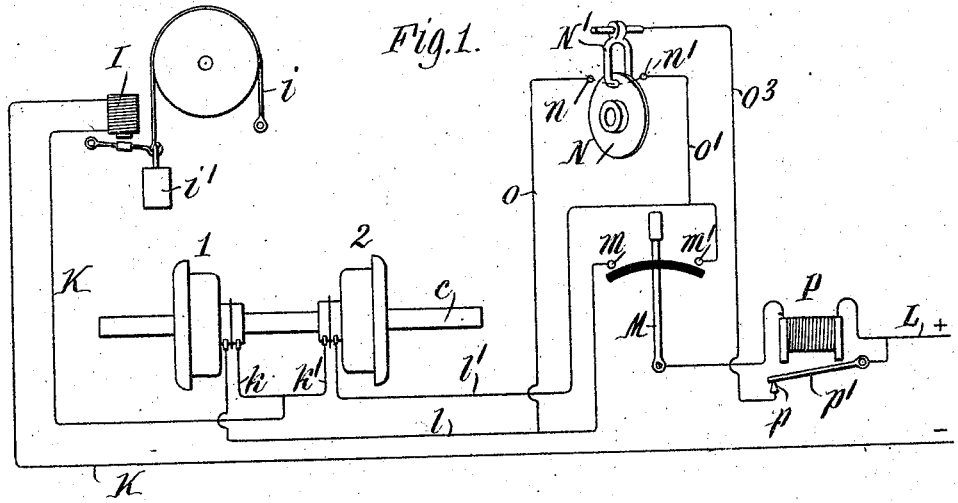
Figure 2:
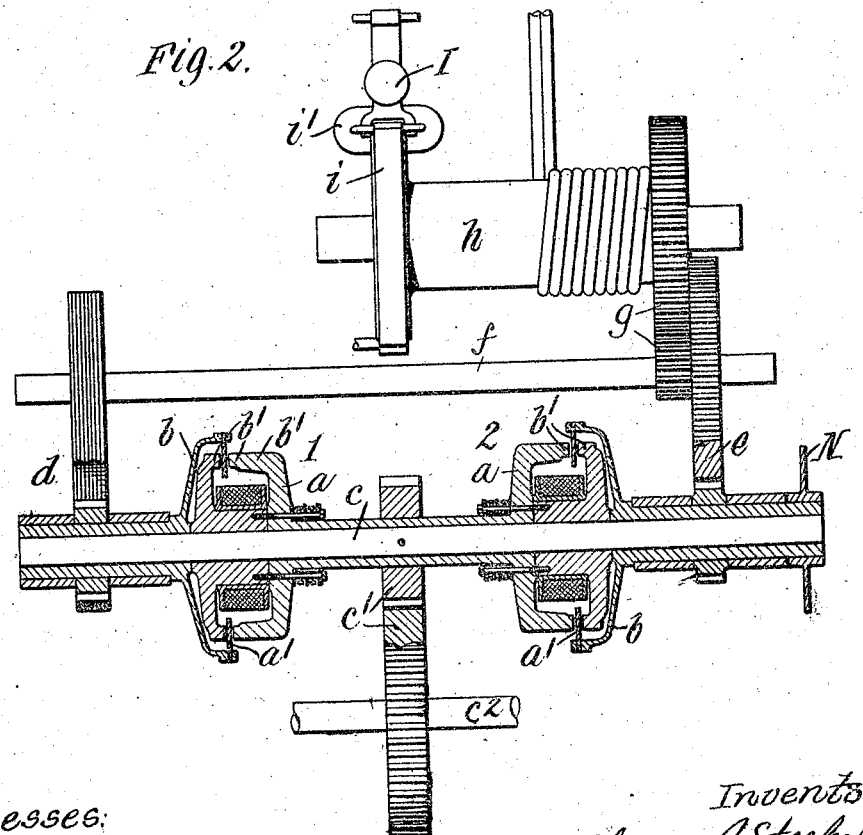

In the accompanying drawings, consisting of two sheets: Figure 1 is a diagrammatic view of a clutch driving mechanism and controlling means therefor embodying the invention. Fig. 2 is a sectional plan view of the driving mechanism. Fig. 3 is a diagrammatic view similar to Fig. 1, showing a modication of the controlling means.

Like characters of reference refer to like parts in the several figures.

1 and 2 represent two electric induction clutches, each comprising a driving member $a$ and a driven member $b$. The clutches are of that sort in which one member, as $b$ of each clutch, carries a conducting ring $a'$ located between electro-magnet poles $b'$ on the other member, so that any relative motion between the clutch members sets up currents in the conducting ring which tend to cause the driven member to rotate with the driving member when the latter is driven and to stop when the driving member is arrested. The driving members $a$ are secured to and turn with a shaft $c$ which is driven continuously in one direction by gearing $c'$ from a continuously running drive shaft or element $c^2$, while the driven members $b$ of the clutches are loose on the shaft $c$, or are free to turn independently thereof. The driven members of the clutches 1 and 2 are respectively connected by sprocket gearing $d$ and gear wheels $e$ to a counter-shaft $f$ which is connected by gearing $g$ to an elevator drum or other element $h$, so that the driven element $h$ will be rotated in one direction by one clutch and in the opposite direction by the other clutch.

The invention is not concerned with the construction of the clutches and the manner of mounting and connecting their members to the driving and driven elements, and the clutches and driving mechanism may be of any suitable construction and arrangement adapted for operating any desired element in opposite directions from a continuously running driving element.

A brake is preferably employed for holding the driven element stationary after it has been arrested by the action of the clutches. An ordinary band brake is shown consisting of a friction band $i$ which passes around a flange on the drum and is operated by a weight or equivalent device $i'$ and an electro-magnetic device I. When current passes through the magnet I it lifts the weight and releases the brake, and when the current is interrupted the weight drops and applies the brake. Any suitable electrically-controlled brake can be employed. While a brake is preferably used it is not essential to the operation of the mechanism, as will later appear.

Two different embodiments of the controlling means are illustrated in the drawings. Referring first to that shown in Figs. 1 and 2, K' and L represent the opposite main conductors of an electric circuit, one of which, as K, connects by branches $k$ $k'$ respectively with the clutches 1 and 2. The other conductor, L, connects with the movable lever M of an operating switch, and branches $l$ $l'$ of this conductor lead from contacts $m$ $m'$ of the switch respectively to the clutches 1 and 2. When the mechanism is used for operating elevators, the switch M is located in the elevator car. The operating switch can be of any suitable construction and located at any convenient point in the circuit. The brake magnet I is interposed in the circuit controlled by the switch.

N represents a disk of conducting material which is connected to one of the parts of the mechanism which rotates in opposite directions, such as the hub of the driven member $b$ of the clutch 2, and N' is a pendulous permanent magnet which is suspended adjacent to the disk N so that the rotation of the disk causes the magnet to swing over against one or the other of two stationary contact pieces $n$ $n'$, depending upon the direction of rotation of the disk. This magnet constitutes the movable member of an automatic auxiliary switch. A mere reversal of this switch would be to use a revolving magnet and a pendulous part of conducting material. The contact pieces $n$ $n'$ are joined by conductors $o$ $o'$ respectively to the branch conductors $l$ $l'$ leading to the two clutches 1 and 2. A conductor $o^3$ joins the magnet N' to a contact $p$ of a relay, the magnet P of which is interposed in the main circuit and has an armature $p'$ which automatically engages the contact $p$ and connects the auxiliary switch with the main circuit when the relay is deënergized by opening the operating switch. The operation of the controlling mechanism as thus described is as follows: If the operating switch lever M is moved from the neutral position shown into engagement with the contact $m$, the circuit will be completed through the main conductor L, relay magnet P, switch lever M, contact $m$, conductor $l$, clutch 1, conductor $k$, main conductor K, and brake magnet I, thus energizing the clutch 1 and causing the same to drive the drum or driven element $h$ in one direction. When the clutch 1 is thus put in operation the passage of the current through the relay magnet P energizes it so that it attracts its armature $p'$ away from the contact $p$ and disconnects the auxiliary switch N N' from the circuit. To stop the drum or driven element $h$, the operating switch lever M is moved to the neutral position, which breaks the main circuit and deënergizes the relay magnet P so that its armature drops against the contact $p$ and connects the conductor $o^3$ to the main circuit. As the driven member $b$ of the other clutch 2 is driven in the opposite direction from the clutch 1 through the gearing connecting it with the driven element $h$, the disk N, which rotates with the member $b$ of the clutch 2, will hold the magnet N' of the automatic switch against the contact $n'$, and a circuit will be completed through clutch 2 by way of the conductor $o^3$, switch magnet N', contact $n'$, conductors $o'$ and $l'$ and thence as before stated. Thus when the clutch 1 has been in operation, driving the drum or driven element $h$ in one direction, and the main switch is operated to cut out the clutch and stop the driven element, the current will be diverted through the other clutch 2, which will act in opposition to the clutch 1, and so arrest the motion of the driven element. To drive the driven element $h$ in the opposite direction the main switch lever is moved into engagement with the other contact $m'$ and the circuit will be completed through the main conductor L, relay magnet P, switch lever M, contact $m'$, conductor $l'$, clutch 2, conductor $k'$, main conductor K and brake magnet I, thus energizing the clutch 2. The relay magnet P will then cut out the automatic switch N N' just as when the other clutch was in operation.

When the operating switch lever M is moved out of engagement with the contact $m'$ to cut out the clutch 2 and stop the driven element $h$, the current through the relay P will be interrupted and the current diverted through the relay armature $p'$, contact $p$, conductor $o^3$, as before explained. As the auxiliary switch disk N then turns in a direction opposite to that in which it was turned before, the switch magnet N' will be held against the contact $n$ and the current will pass through the clutch 1 by way of the magnet N' of the auxiliary switch, contact $n$ and conductors $o$ and $l$. The driven member of the clutch 1, being driven a direction opposite to that of the clutch 2 through the gearing connecting it with the driven element, it will act in opposition to this clutch 2, tending to arrest the driven element. As soon as the mechanism comes to rest, irrespective of which clutch has been in operation, the magnet N' of the auxiliary switch will swing by gravity back to its central position away from the contact $n$ or $n'$ with which it was in engagement, thus interrupting the circuit through the automatic switch and completely cutting off the current from both of the clutches. The reversing action of each clutch thus takes place only after the power has been cut off from the driving clutch and the mechanism is coasting or running under its own momentum, and ceases when the parts come to rest.

As the current must pass through and energize the brake magnet I whenever either clutch is energized, whether through the operating or the auxiliary switch, the brake is held released until the parts come to rest and the auxiliary switch magnet N' breaks the circuit, when the brake will be applied to hold the driven element stationary. The brake is not essential to the described action of the clutches and it can be omitted if desired without changing the construction or operation of the mechanism.

Means different from those described can be employed to produce the reversing action of the clutches only when the operating switch is open. For instance, as shown in Fig. 3, the revolving disk N coöperates with a pendulous electro-magnet $N^2$ having a winding adapted to be connected across the main circuit by conductors $q$ $q'$, one of which leads to a contact $q^2$ arranged to be engaged by the lever of the operating switch M when it is opened. The switch magnet $N^2$ is only energized when the operating switch is opened, to cut off the power, and the mechanism is coasting. One of the conductors $q$ $q'$ for energizing the magnet $N^2$, for instance, the conductor $q'$, is connected to the core of the magnet $N^2$ at $q^3$ so that when the magnet is moved against one of the contacts $n$ $n'$ a circuit is completed through one or the other of the clutches 1, 2, as before. The pendulous electro-magnet makes the relay P unnecessary. The auxiliary switch in this construction operates in the same manner as the other to produce the reversing action of the clutches.

I claim as my invention:

1. The combination of two electric clutches having driving members which rotate in one direction and driven members arranged to drive machinery in opposite directions, means for exciting either clutch, and means operated by the motion of the machinery when the current is cut off from the driving clutch for exciting the other clutch, whereby the latter clutch acts to retard the motion of the machinery, substantially as set forth.

2. The combination of two electric clutches having driving members which rotate in one direction and driven members arranged to drive machinery in opposite directions, means for exciting either clutch, and automatic means which operate during the motion of the machinery after the current has been cut off from the driving clutch for exciting the other clutch, whereby the latter clutch acts to retard the motion of the machinery, substantially as set forth.

3. The combination of two electric clutches having driving members which rotate in one direction and driven members arranged to rotate relative to said driving members, a driven element geared to the driven members of said clutches to be turned in one direction by one clutch and in the opposite direction by the other clutch, means for exciting either clutch, and an automatic switch and connections which operate during the motion of said driven element after the current is cut off from the driving clutch for exciting the other clutch, whereby the latter clutch acts to retard the motion of said driven element, substantially as set forth.

4. The combination of two electric clutches having driving members which rotate in one direction and driven members arranged to drive machinery in opposite directions, an operating switch and electrical connections for separately exciting said clutches, and electrical means which are put in action by said switch when it is operated to cut off current from one clutch to excite the other clutch, whereby said latter clutch acts to retard the motion of the machinery, substantially as set forth.

5. The combination of two electric clutches having driving members which rotate in one direction and driven members arranged to drive machinery in opposite directions, an operating switch and electrical connections for separately exciting said clutches, and electrical means which are put in action by said switch when it is operated to cut off current from one clutch to excite the other clutch, whereby said latter clutch acts to retard the motion of the machinery, said electrical means being rendered inactive by the stopping of the machinery, substantially as set forth.

6. The combination of two electric clutches having driving members which rotate in one direction and driven members arranged to drive machinery in opposite directions, means for exciting either clutch, automatic means which operate during the motion of the machinery after the current has been cut off from the driving clutch for exciting the other clutch, whereby the latter clutch acts to retard the motion of the machinery, and a brake which is automatically applied to hold said machinery when it is arrested, substantially as set forth.

7. The combination of two electric clutches having driving members which rotate in one direction and driven members arranged to drive machinery in opposite directions, an operating switch and electrical connections for separately exciting said clutches, electrical means which are put in action by said switch when it is operated to cut off current from one clutch to excite the other clutch, whereby said latter clutch acts to retard the motion of the machinery, and an electrical brake for said machinery which is controlled by said electrical means, substantially as set forth.

8. The combination of two electric clutches having driving members which rotate in one direction and driven members arranged to rotate relative to said driving members, a driven element geared to the driven members of said clutches to be turned in one direction by one clutch and in the opposite direction by the other clutch; means for separately exciting said clutches, and an automatic switch and connections comprising a member which rotates with said driven member and a member which is moved by said rotary member after the current is cut off from the driving clutch for exciting the other clutch, whereby the latter clutch acts to retard the motion of said driven element, substantially as set forth.

9. The combination of two electric clutches having driving members which rotate in one direction and driven members arranged to rotate relative to said driving members; a driven element geared to the driven members of said clutches to be turned in one direction by one clutch and in the opposite direction by the other clutch, means for separately exciting said clutches, and electrical means comprising a disk of conducting material which rotates with said driven member and a magnet which is moved by said disk after the current is cut off from the driving clutch for closing an electric circuit to excite the other clutch, whereby the latter clutch acts to retard the motion of said driven element, substantially as set forth.

Witness my hand, this 30th day of November, 1908.

ABRAM P. STECKEL.

Witnesses:
WALLACE BUELL,
WM. HINCKLEY MITCHELL.